United States Patent
Chang

(10) Patent No.: US 8,234,062 B2
(45) Date of Patent: Jul. 31, 2012

(54) METHOD FOR ADJUSTING DISPLAYED NAVIGATION DIRECTION USING SENSORS AND NAVIGATION DEVICE USING THE SAME

(75) Inventor: Chien-Yang Chang, Taoyuan (TW)

(73) Assignee: Mitac International Corp., Taoyuan (KR)

( * ) Notice: Subject to any disclaimer, the term of this patent is extended or adjusted under 35 U.S.C. 154(b) by 276 days.

(21) Appl. No.: 12/713,627

(22) Filed: Feb. 26, 2010

(65) Prior Publication Data

US 2010/0235093 A1 Sep. 16, 2010

(30) Foreign Application Priority Data

Mar. 10, 2009 (TW) .............................. 98107620 A

(51) Int. Cl.
*G01C 21/00* (2006.01)

(52) U.S. Cl. ...................................................... 701/409

(58) Field of Classification Search .................. 701/400, 701/408, 409, 412, 432
See application file for complete search history.

(56) References Cited

U.S. PATENT DOCUMENTS

2002/0165646 A1 * 11/2002 Bohr et al. .................. 701/1
* cited by examiner

*Primary Examiner* — Kim T Nguyen
(74) *Attorney, Agent, or Firm* — Birch, Stewart, Kolasch & Birch, LLP

(57) ABSTRACT

A method for adjusting displayed map using sensors is disclosed, applied in a navigation device. The method includes steps of: calculating a GPS-based rotating angle of the navigation device based on location information detected by a GPS module of the navigation device when a coordinate error value of the navigation device is less than a predetermined value; using a sensor of the navigation device to detect the sensor-based rotating angle of the navigation device when the coordinate error value of the navigation device is greater than the predetermined value; rotating a map on the screen according to one of the GPS-based rotating angle and the sensor-based rotating angle depending on the coordinate error value.

8 Claims, 2 Drawing Sheets

METHOD FOR ADJUSTING DISPLAYED NAVIGATION DIRECTION USING SENSORS AND NAVIGATION DEVICE USING THE SAME

CROSS REFERENCE TO RELATED APPLICATION

This Application claims priority of Taiwan Patent Application No. 098107620, filed on Mar. 10, 2009, the entirety of which is incorporated by reference herein.

BACKGROUND OF THE INVENTION

1. Field of the Invention

The present invention relates to a navigation device, and in particular relates to a method for adjusting displayed navigation direction and a navigation device using the same.

2. Description of the Related Art

Due to application convenience and lower costs for GPS chips and modules, more and more navigation functions are being applied in consumer products such as mountain climbing navigation systems, personal tracking systems, and car navigation systems. Of the consumer product applications, car navigation systems are very popular.

Car navigation systems can be classified as embedded and portable navigation systems. Portable navigation devices can be further classified as GPS navigation devices, and personal navigation devices, wherein the GPS is built into portable devices such as personal digital assistants (PDA) or smart phones.

There are two ways to display information for conventional portable car navigation devices: one is North Up, wherein a map in a display is always displayed facing north; the other is Heading Up, wherein a map in a display is always displayed facing the direction of travel. The Heading Up display is the most commonly used.

However, requirements of users may not be met if a user needs to use a conventional portable car navigation device to point a direction as walking.

BRIEF SUMMARY OF INVENTION

A detailed description is given in the following embodiments with reference to the accompanying drawings. The object of the present invention is to provide a method for adjusting displayed navigation direction using sensors and a navigation device using the same.

The present invention provides a method for adjusting displayed map using sensors, applied in a navigation device. The method comprises: calculating a GPS-based rotating angle of the navigation device based on location information detected by a GPS module of the navigation device when a coordinate error value of the navigation device is less than a predetermined value; using a sensor of the navigation device to detect the sensor-based rotating angle of the navigation device when the coordinate error value of the navigation device is greater than the predetermined value; rotating a map on the screen according to one of the GPS-based rotating angle and the sensor-based rotating angle depending on the coordinate error value.

The present invention further provides a navigation device. The navigation device comprises: a screen for displaying a map; a GPS module for calculating a GPS-based rotating angle of the navigation device based on a location information detected by the GPS module of the navigation device when a coordinate error value of the navigation device is less than a predetermined value; a sensor for detecting a sensor-based rotating angle of the navigation device when the coordinate error value of the navigation device is greater than a predetermined value; and a microprocessor for rotating a map according to one of the GPS-based rotating angle and the sensor-based rotating angle depending on the coordinate error value.

BRIEF DESCRIPTION OF DRAWINGS

The present invention can be more fully understood by reading the subsequent detailed description and examples with references made to the accompanying drawings, wherein.

DETAILED DESCRIPTION OF INVENTION

The following description is of the best-contemplated mode of carrying out the invention. This description is made for the purpose of illustrating the general principles of the invention and should not be taken in a limiting sense. The scope of the invention is best determined by reference to the appended claims.

An embodiment of the present invention discloses a method for adjusting displayed navigation direction using sensors and a navigation device using the same.

The method for adjusting displayed navigation direction which uses sensors (sensors may be G-sensors and M-sensors which is abbreviated as G/M sensors, or gyroscopes herein) providing "what you see is what you get", which is abbreviated as WYSIWYG. That is, when the navigation device is in a walk/jog mode, the interface of the navigation device displays a navigation map matching the direction of a user and when the user changes direction, the navigation map also correspondingly changes direction.

Figure 1:
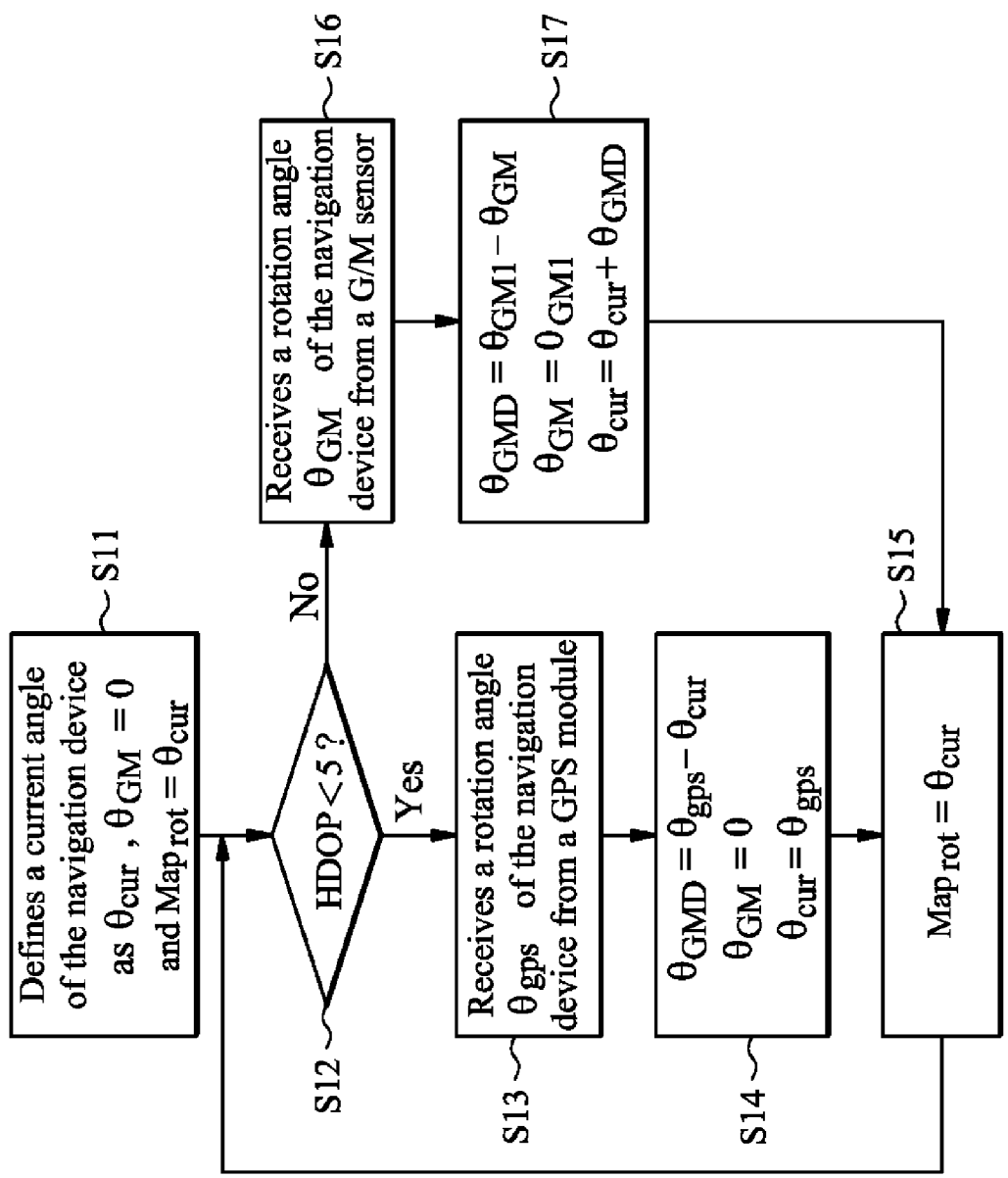
FIG. 1 is a flowchart illustrating the method for adjusting displayed navigation direction using sensors according to an embodiment of the present invention.

FIG. 1 is a flowchart illustrating the method for adjusting displayed navigation direction using sensors according to an embodiment of the present invention.

First, a current angle of a navigation device is defined as $\theta_{cur}$, the angle $\theta_{GM}$ of the G/M sensor in the navigation device is initialized as zero, and a map direction $Map_{rot}$ of navigation interface of the navigation device is set (rotated) as $\theta_{cur}$ (step S11). It is determined whether a coordinate error value (i.e. Horizontal Dilution of Precision, HDOP) is less than a predetermined value such as 5 (HDOP<5) (step S12).

The HDOP is a root-mean-square value derived from latitude value and precision error value. The smaller the root-mean-square value is, the higher the precision value is. In the embodiment, when the HDOP is smaller than the predetermined value, the precision is increased such that fine-tuning is executed. On the other hand, when the HDOP is larger than or equal to the predetermined value, the precision is lowered such that coarse-tuning is executed.

When the coordinate error value is smaller than the predetermined value, then a rotation angle $\theta_{gps}$ of the navigation device is obtained by a GPS module of the navigation device (step S13). Next, the current angle $\theta_{cur}$ of the navigation device is subtracted from the rotation angle $\theta_{gps}$ of the navigation device to obtain an angle variation value $\theta_{GMD}$ therebetween ($\theta_{GMD}=\theta_{gps}-\theta_{cur}$). The rotation angle $\theta_{GM}$ of the G/M sensor is set as zero and the current angle $\theta_{cur}$ of the navigation device is assigned as the rotation angle $\theta_{gps}$ of the navigation device ($\theta_{cur}=\theta_{gps}$) (step S14). When the above-mentioned angle information is obtained, the map direction is set (rotated) as the current angle $\theta_{cur}$ of the navigation device ($\text{Map}_{rot}=\theta_{cur}$) (step S15).

When the coordinate error value is larger than or equal to the predetermined value, the angle $\theta_{GM1}$ of the navigation device is obtained by the G/M sensor of the navigation device (step S16). Next, the rotation angle $\theta_{GM}$ is subtracted from the rotation angle $\theta_{GM1}$ of the navigation device to obtain a angle variation value $\theta_{GMD}$ therebetween ($\theta_{GMD}=\theta_{GM1}-\theta_{GM}$), the rotation angle $\theta_{GM}$ of the G/M sensor is set as $\theta_{GM1}$ ($\theta_{GM}=\theta_{GM1}$) and the current angle $\theta_{cur}$ of the navigation is assigned as the current angle $\theta_{cur}$ plus the angel variation value $\theta_{GMD}$ ($\theta_{cur}=\theta_{cur}+\theta_{GMD}$) (step S17). When the above-mentioned angle information is obtained, the map direction in the interface of the navigation device is set (rotated) as the current angle $\theta_{cur}$ of the navigation device (step 15).

Figure 2:
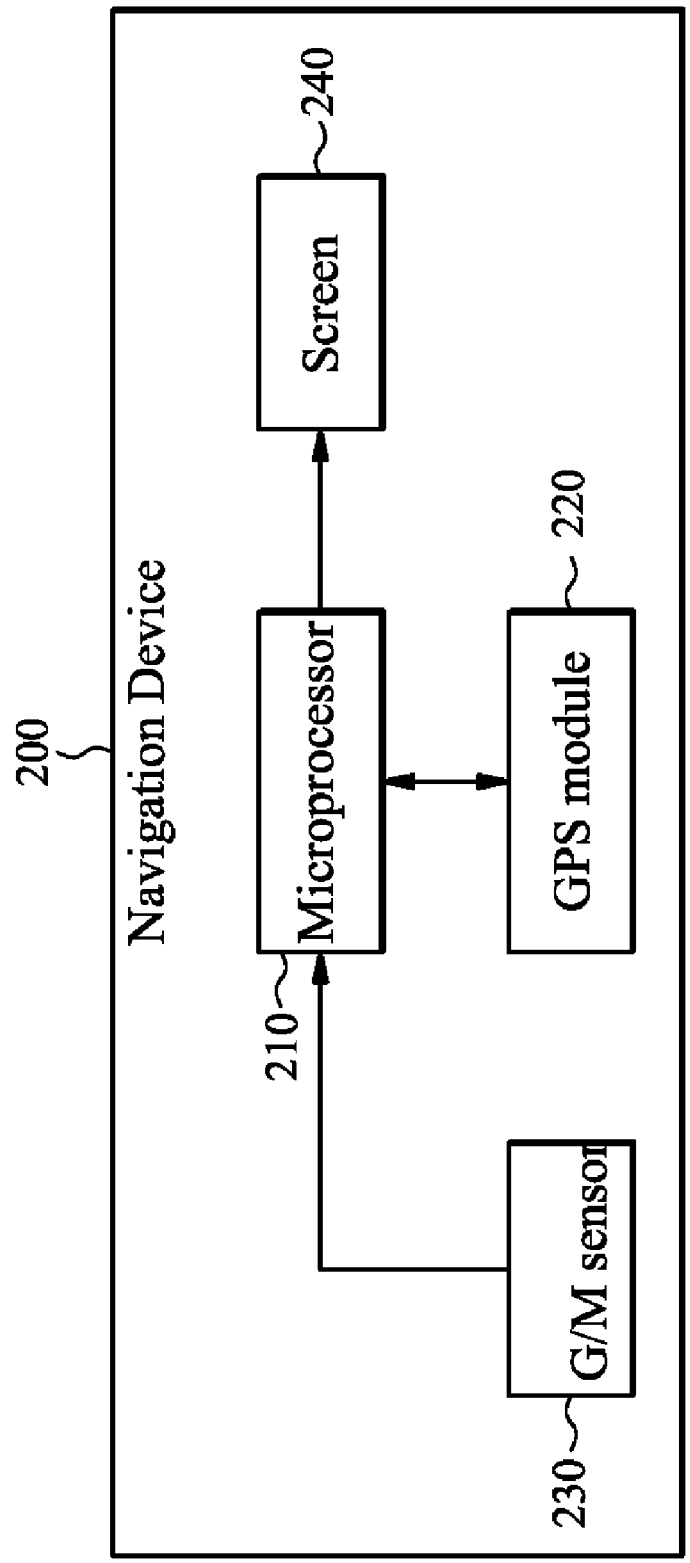
FIG. 2 is a diagram showing the structure of a navigation device of the present invention.

FIG. 2 is a diagram showing the structure of a navigation device of the present invention.

An embodiment of the present invention discloses a navigation device 200. The navigation device includes a microprocessor 210, a GPS module 220, a G/M sensor 230 and a screen 240.

When the navigation device 200 is initialized, the microprocessor 210 defines a current angle $\theta_{cur}$ of the navigation device 200 according to satellite signals obtained from a GPS module 220, initializes the rotation angle $\theta_{GM}$ of the G/M sensor 230 as zero, and sets (rotates) a map direction $\text{Map}_{rot}$ in the screen 240 as the current angle $\theta_{cur}$ ($\text{Map}_{rot}=\theta_{cur}$).

Next, the microprocessor 210 determines whether a coordinate error value (i.e. GDOP) of the navigation device is smaller than a predetermined value (e.g. 5, HDOP<5) according to the GPS module 220. When the coordinate error value is smaller than the predetermined value, the microprocessor obtains a rotation angle $\theta_{GPS}$ of the navigation device 200 by GPS module 220.

Next, the microprocessor 210 subtracts the current angle $\theta_{cur}$ of the navigation device 200 from the rotation angle $\theta_{gps}$ of the navigation device 200 to obtain a angle variation value $\theta_{GMD}$ therebetween ($\theta_{GMD}=\theta_{gps}-\theta_{cur}$), sets the rotation angle $\theta_{GM}$ of the G/M sensor 230 as zero, and assigns the current angle $\theta_{cur}$ as the rotation angle $\theta_{gps}$ ($\theta_{cur}=\theta_{gps}$). When the above-mentioned angle information is obtained, the microprocessor 210 sets (rotates) the map direction as the current angle $\theta_{cur}$ of the navigation device 200 ($\text{Map}_{rot}=\theta_{cur}$).

When the coordinate error value is larger than or equal to the predetermined value, the microprocessor 210 obtains the angle $\theta_{GM1}$ of the navigation device by the G/M sensor of the navigation device. Next, the microprocessor 210 subtracts the rotation angle $\theta_{GM}$ from the rotation angle $\theta_{GM1}$ of the navigation device to obtain a angle variation value $\theta_{GMD}$ therebetween ($\theta_{GMD}=\theta_{GM1}-\theta_{GM}$), sets the rotation angle $\theta_{GM1}$ of the G/M sensor as $\theta_{GM}$ ($\theta_{GM}=\theta_{GM1}$) and assigns the current angle $\theta_{cur}$ of the navigation as the current angle $\theta_{cur}$ plus the angel variation value $\theta_{GMD}$ ($\theta_{cur}=\theta_{cur}+\theta_{GMD}$). When the above-mentioned angle information is obtained, the microprocessor 210 sets (rotates) the map direction in the interface of the navigation device as the current angle $\theta_{cur}$ of the navigation device 200.

It is noted that when the measurement of the GPS module is not accurate enough, the G/M sensor is used to assist measurement of displacement or rotation angle. Therefore, when the GDOP is small, the displacement or rotation angle may be measured accurately by only employing the GPS, in this case, the function of the G/M sensor may be ignored hence the angle measured by the G/M may be set as zero. On the contrary, when the GDOP is large, it is necessary to employ the G/M sensor to measure displacement or rotation angle. It is noted that in the embodiment, the method for adjusting displayed navigation direction is mainly applied in a walk mode, but it may also bee applied in a drive mode or other navigation modes.

The present invention, and its method and particular implementation can be presented in a type of program code. The program code may be contained in concrete medium such as soft disc, compassed disc, hard disc or any other machine-readable (e.g. computer-readable) storage medium. When the code is executed by a machine such as a computer, the machine is turned into a device of the present invention. The program code is also may be transmitted by certain transmitting medium such as wire, cable, optical fiber, or any other type of transmission. When the code is received, loaded into and executed by a machine such as a computer, the machine is turned into a device of the present invention. When implemented in a general purpose processing unit, the processing unit associated with the program code may be a particular device operated as the application-specific integrated circuit.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for adjusting displayed map using sensors, applied in a navigation device, comprising the steps of:
   calculating a GPS-based rotating angle of the navigation device based on location information detected by a GPS module of the navigation device when a coordinate error value of the navigation device is less than a predetermined value;
   using a sensor of the navigation device to detect a sensor-based rotating angle of the navigation device when the coordinate error value of the navigation device is greater than the predetermined value;
   rotating a map on a screen of the navigation device according to one of the GPS-based rotating angle and the sensor-based rotating angle depending on the coordinate error value.

2. The method as claimed in claim 1, wherein the rotating the map further comprising:
   setting a map angle of the map as one of the GPS-based rotating angle and the sensor-based rotating angle; and
   rotating the map by the map angle.

3. The method as claimed in claim 1, wherein rotating a map further comprising: comprises:
   defining the sensor-based rotating angle of the sensor, and a current angle of the navigation device;
   subtracting the sensor-based rotating angle of the sensor from the GPS-based rotating angle of the navigation device to obtain an angle variation value;
   setting a map angle as the current angle plus the angle variation value; and
   rotating the map by the map angle.

4. The method as claimed in claim 1, wherein the sensor is a G/M sensor or a gyroscope.

5. A navigation device, comprising:
   a screen for displaying a map;
   a GPS module for calculating a GPS-based rotating angle of the navigation device based on a location information detected by the GPS module of the navigation device when a coordinate error value of the navigation device is less than a predetermined value;

a sensor for detecting a sensor-based rotating angle of the navigation device when the coordinate error value of the navigation device is greater than a predetermined value; and a microprocessor for rotating a map according to one of the GPS-based rotating angle and the sensor-based rotating angle depending on the coordinate error value.

6. The navigation device as claimed in claim 5, wherein the microprocessor further sets a map angle of the map as one of the GPS-based rotating angle and the sensor-based rotating angle; and rotates the map by the map angle.

7. The navigation device as claimed in claim 5, wherein the microprocessor further defines the sensor-based rotating angle of the sensor, and a current angle of the navigation device; subtracts the sensor-based rotating angle of the sensor from the GPS-based rotating angle of the navigation device to obtain a angle variation value; sets a map angle as the current angle plus the angle variation value; and rotates the map by the map angle.

8. The navigation device as claimed in claim 5, wherein the sensor is a G/M sensor or a gyroscope.

* * * * *